US011239695B2

(12) United States Patent
Thirumalai Ananthan Pillai et al.

(10) Patent No.: US 11,239,695 B2
(45) Date of Patent: Feb. 1, 2022

(54) WIRELESS POWER SYSTEM WITH DEVICE PRIORITY

(71) Applicant: Apple Inc., Cupertino, CA (US)

(72) Inventors: Srinivasa V. Thirumalai Ananthan Pillai, Santa Clara, CA (US); Marco Rondinini, San Francisco, CA (US); Michael A. Cretella, San Jose, CA (US); Daniel Ye, San Francisco, CA (US); Cortland S. Tolva, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 239 days.

(21) Appl. No.: 16/421,291

(22) Filed: May 23, 2019

(65) Prior Publication Data

US 2020/0059113 A1    Feb. 20, 2020

Related U.S. Application Data

(60) Provisional application No. 62/718,860, filed on Aug. 14, 2018.

(51) Int. Cl.
*H02J 50/60* (2016.01)
*H02J 50/10* (2016.01)
(Continued)

(52) U.S. Cl.
CPC .............. *H02J 50/10* (2016.02); *H01F 38/14* (2013.01); *H02J 7/0047* (2013.01); *H02J 7/025* (2013.01);
(Continued)

(58) Field of Classification Search
CPC .. H02J 50/10; H02J 7/025; H02J 50/90; H02J 7/0047; H02J 50/60; H02J 50/80;
(Continued)

(56) References Cited

U.S. PATENT DOCUMENTS

| 10,128,688 | B2 | 11/2018 | Von Novak, III et al. |
| 10,148,097 | B1 | 12/2018 | Leabman et al. |

(Continued)

FOREIGN PATENT DOCUMENTS

| CN | 106972638 A | 7/2017 |
| WO | 2017171440 A1 | 10/2017 |

*Primary Examiner* — Nghia M Doan
(74) *Attorney, Agent, or Firm* — Treyz Law Group, P.C.; Jason Tsai

(57) ABSTRACT

A wireless power system may have a wireless power transmitting device and wireless power receiving devices. The wireless power transmitting device has wireless power transmitting circuitry with coils to transmit wireless power to wireless power receiving devices. The wireless power receiving devices are placed on the wireless power transmitting device in an order. Batteries in the wireless power receiving devices are charged based at least partly on the order. Power allocation is based on utilization factor information such as information on a power draw associated with each of the power receiving devices. Measurement circuitry in the wireless power transmitting device is used to gather impedance images from the coils. Changes in the impedance images are used to temporarily halt power transmission. Power transmission is resumed depending on whether in-band communications are lost or are maintained.

19 Claims, 5 Drawing Sheets

(51) Int. Cl.
*H02J 7/02* (2016.01)
*H02J 50/90* (2016.01)
*H02J 7/00* (2006.01)
*H04B 5/00* (2006.01)
*H01F 38/14* (2006.01)

(52) U.S. Cl.
CPC ............ H02J 50/90 (2016.02); H04B 5/0037 (2013.01); *H02J 50/60* (2016.02)

(58) Field of Classification Search
CPC .. H02J 7/00045; H02J 7/0048; H04B 5/0037; H04B 5/0031; H04B 5/0081; H04B 5/0056; H01F 38/14
See application file for complete search history.

(56) References Cited

U.S. PATENT DOCUMENTS

| | | |
|---|---|---|
| 2012/0293011 A1 | 11/2012 | Byun et al. |
| 2015/0048789 A1 | 2/2015 | Kim et al. |
| 2015/0380976 A1* | 12/2015 | Heo ........................ H02J 50/80 455/573 |
| 2015/0380979 A1 | 12/2015 | Fukaya |
| 2016/0126749 A1 | 5/2016 | Shichino |
| 2016/0006289 A1 | 7/2016 | Sever et al. |
| 2017/0040828 A1* | 2/2017 | Carlson ................... B60L 53/39 |
| 2017/0093199 A1* | 3/2017 | Pinciuc ................... H02J 50/90 |
| 2017/0098149 A1 | 4/2017 | Kesler et al. |
| 2017/0237296 A1 | 8/2017 | Keith et al. |
| 2018/0097408 A1 | 4/2018 | Oh et al. |
| 2018/0145545 A1 | 5/2018 | Azami et al. |
| 2018/0219431 A1* | 8/2018 | Guillermo ............... H02J 50/60 |
| 2018/0233942 A1* | 8/2018 | Qiu ........................ H02J 50/10 |

* cited by examiner

| PRIORITY TABLE ||
|---|---|
| DEVICE ID | CHARGING STATUS |
| ID DEVICE A | YES |
| ID DEVICE B | YES |
| ID DEVICE C | NO |
| ⋮ | |

*FIG. 3*

WIRELESS POWER SYSTEM WITH DEVICE PRIORITY

This application claims priority to U.S. provisional patent application No. 62/718,860 filed on Aug. 14, 2018, which is hereby incorporated by reference herein in its entirety.

FIELD

This relates generally to power systems, and, more particularly, to wireless power systems for charging electronic devices.

BACKGROUND

In a wireless charging system, a wireless charging mat wirelessly transmits power to a portable electronic device that is placed on the mat. The portable electronic device has a coil and rectifier circuitry. The coil receives alternating-current wireless power signals from a coil in the wireless charging mat that is overlapped by the coil in the portable electronic device. The rectifier circuitry converts the received signals into direct-current power.

SUMMARY

A wireless power system has a wireless power transmitting device. The wireless power transmitting device uses coils to transmit wireless power to wireless power receiving devices placed on the wireless power transmitting device.

The wireless power receiving devices are placed on the wireless power transmitting device in an order. Batteries in the wireless power receiving devices are charged based at least partly on the order. Power allocation between multiple power receiving devices is based on utilization factor information in addition to information on the order in which the power receiving devices are placed on the wireless power transmitting device. The utilization factor information includes a utilization factor value computed for each wireless power receiving device. The utilization factor value is computed by dividing the power draw of each device by the total power draw of all power receiving devices that are receiving wireless power from the wireless power transmitting device.

Measurement circuitry in the wireless power transmitting device is used to gather impedance readings such as impedance images from the coils. Changes in the impedance readings (e.g., changes to impedance images) cause the wireless power transmitting device to temporarily halt power transmission. Power transmission may be resumed depending on whether in-band communications are lost or are maintained.

In accordance with embodiments, control circuitry in the wireless power receiving device monitors the output voltage of a rectifier in the wireless power receiving device to determine whether wireless power transmission has been interrupted. A charging status indicator is displayed on the wireless power receiving device when wireless power is being received. A charging status indicator debounce period may be used to help prevent flickering in the charging status indicator. The debounce period may be adjusted depending on whether detected power losses are due to a user lifting the wireless power receiving device and its wireless power receiving circuitry away from a charging surface of the wireless power transmitting device or are not due to user lifting of the receiving device and its circuitry. This ensures that sufficiently long debounce periods are available to prevent undesired charging status indicator flickering while shortening the debounce period to enhance the responsiveness of the indicator when a user lifts the receiving device.

BRIEF DESCRIPTION OF THE DRAWINGS

FIG. 3 is a diagram of an illustrative charging priority table in accordance with an embodiment.

DETAILED DESCRIPTION

A wireless power system includes a wireless power transmitting device such as a wireless charging mat. The wireless power transmitting device wirelessly transmits power to one or more wireless power receiving devices. The wireless power receiving devices may include devices such as wristwatches, cellular telephones, tablet computers, laptop computers, ear buds, battery cases for ear buds and other devices, tablet computer pencils and other input-output devices, wearable devices, or other electronic equipment. The wireless power receiving devices use power from the wireless power transmitting device for powering internal components and for charging an internal battery. Because transmitted wireless power is often used for charging internal batteries, wireless power transmission operations are sometimes referred to as wireless charging operations.

The wireless power transmitting device communicates with each wireless power receiving device and obtains information on the characteristics of each wireless power receiving device. The wireless power transmitting device uses information from wireless power receiving devices and measurements made in the wireless power transmitting device to establish a satisfactory wireless charging scheme. Factors that are taken into account in setting up charging in the wireless charging system include battery charge state, the ability of devices to receive power (e.g., power drawn be the devices), the order in which power receiving devices are placed in range of the wireless power transmitting device, and other information.

Figure 1:
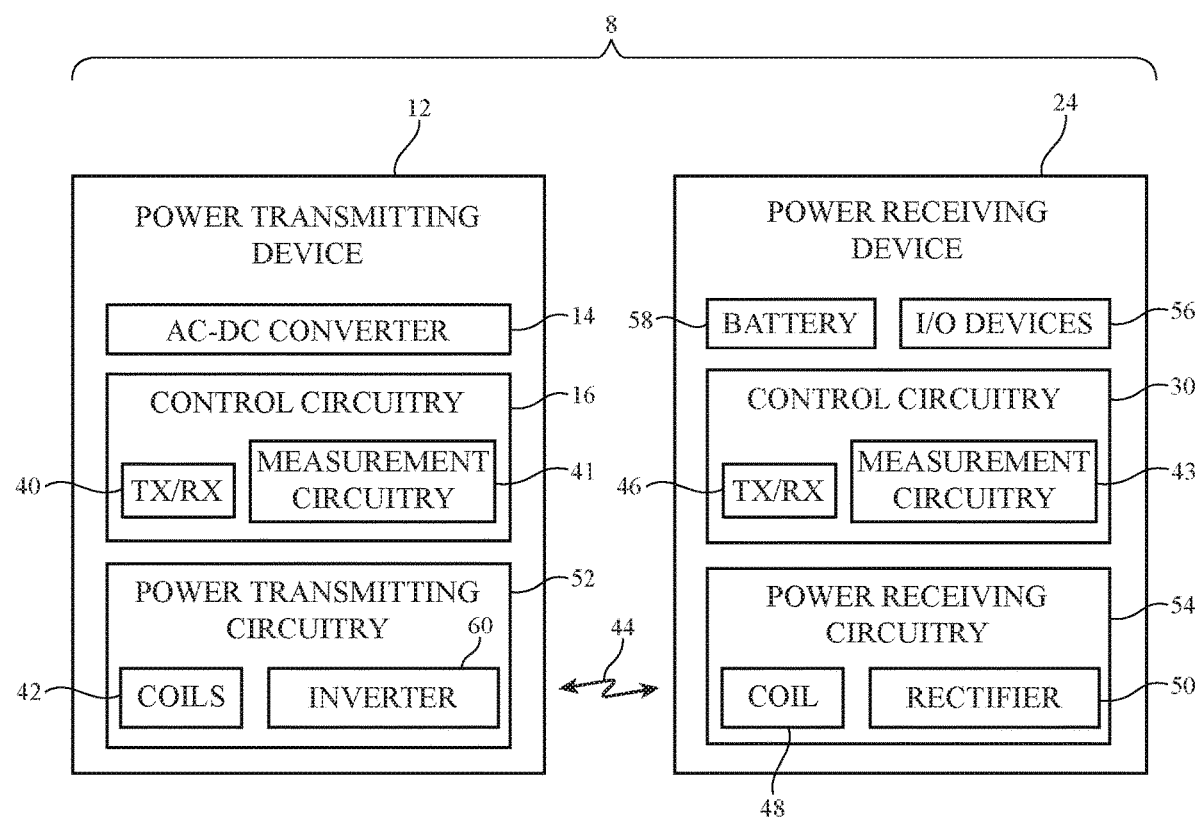
FIG. 1 is a schematic diagram of an illustrative wireless charging system that includes a wireless power transmitting device and a wireless power receiving device in accordance with an embodiment.

An illustrative wireless power system (wireless charging system) is shown in FIG. 1. As shown in FIG. 1, wireless power system 8 includes a wireless power transmitting device such as wireless power transmitting device 12 and includes a wireless power receiving device such as wireless power receiving device 24. Wireless power transmitting device 12 includes control circuitry 16. Wireless power receiving device 24 includes control circuitry 30. Control circuitry in system 8 such as control circuitry 16 and control circuitry 30 is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, determining power transmission levels, processing sensor data and other data, processing user input, handling negotiations between devices 12 and 24, sending and receiving in-band and out-of-band data, making measurements, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of control circuitry 16 and/or 30. The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable electronic device (cellular telephone, tablet computer, laptop computer, etc.), may be equipment that has been incorporated into furniture, a vehicle, or other system, or may be other wireless power transfer equipment. Illustrative configurations in which wireless power transmitting device 12 is a wireless charging mat are sometimes described herein as an example.

Power receiving device 24 may be a portable electronic device such as a wristwatch, a cellular telephone, a laptop computer, a tablet computer, an accessory such as an earbud, a battery case, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. In some configurations, AC-DC power converter 14 may be provided in an enclosure (e.g., a power brick enclosure) that is separate from the enclosure of device 12 (e.g., a wireless charging mat enclosure) and a cable may be used to couple DC power from the power converter to device 12. DC power may be used to power control circuitry 16. During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more transmit coils 42. Coils 42 may be arranged in a planar coil array (e.g., in configurations in which device 12 is a wireless charging mat). The coils may be arranged in multiple layers (e.g., three layers or any other suitable number of layers) and each of the multiple layers may have coils that overlap coils in other layers.

As the AC currents pass through one or more coils 42, alternating-current electromagnetic (e.g., magnetic) fields (signals 44) are produced that are received by one or more corresponding receiver coils such as coil 48 in power receiving device 24. When the alternating-current electromagnetic fields are received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering an energy storage device such as battery 58 and can be used in powering other components in device 24. For example, device 24 may include input-output devices 56 such as a display, touch sensor, communications circuits, audio components, sensors, and other components and these components may be powered by the DC voltages produced by rectifier 50 (and/or DC voltages produced by battery 58 or other energy storage device in device 24).

Device 12 and/or device 24 may communicate wirelessly using in-band or out-of-band communications. Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12.

Wireless transceiver circuitry 40 can use one or more coils 42 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions. Other types of in-band communications may be used, if desired.

During wireless power transmission operations, circuitry 52 supplies AC drive signals to one or more coils 42 at a given power transmission frequency. The power transmission frequency may be, for example, a predetermined frequency of about 125 kHz, at least 80 kHz, at least 100 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

During wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48. Other types of in-band communications between device 12 and device 24 may be used, if desired.

In-band communications between device 24 and device 12 uses ASK modulation and demodulation techniques or other suitable in-band communications techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows ASK data bits (e.g., ASK data packets) to be transmitted in-band from device 24 to device 12 with coils 48 and 42 while power is simultaneously being wirelessly conveyed from device 12 to device 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. During object detection and characterization operations, external object measurement circuitry 41 can be used to make measurements on coils 42 to determine whether any devices 24 are present on device 12 (e.g., whether devices 24 are suspected to be present on device 12). In capturing data from an array of coils 42, a pattern is formed, which is sometimes referred to as an impedance image or inductance image. The image may be processed by system 8 to determine which power transmission settings to use for transmitting power, etc. For example, the image can be processed to detect movement of devices 24 (in which case power transmission can be momentarily halted).

In an illustrative arrangement, measurement circuitry 41 of control circuitry 16 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, switching circuitry in device 12 may be adjusted by control circuitry 16 to switch each of coils 42 into use. As each coil 42 is selectively switched into use, control circuitry 16 uses the signal generator circuitry of signal measurement circuitry 41 to apply a probe signal to that coil while using the signal detection circuitry of signal measurement circuitry 41 to measure a corresponding response. Measurement circuitry 43 in control circuitry 30 and/or in control circuitry 16 may also be used in making current and voltage measurements.

The characteristics of each coil 42 depend on whether any foreign objects overlap that coil (e.g., coins, wireless power receiving devices, etc.) and also depend on whether a wireless power receiving device with a coil such as coil 48 of FIG. 1 is present, which could increase the measured inductance of any overlapped coil 42. Signal measurement circuitry 41 is configured to apply signals to the coil and measure corresponding signal responses. For example, signal measurement circuitry 41 may apply an alternating-current probe signal while monitoring a resulting signal at a node coupled to the coil. As another example, signal measurement circuitry 41 may apply a pulse to the coil and measure a resulting impulse response (e.g., to measure coil inductance). Using measurements from measurement circuitry 41, the wireless power transmitting device can determine whether an external object is present on the coils. If, for example, all of coils 42 exhibit their expected nominal response to the applied signals, control circuitry 16 can conclude that no external devices are present. If one of coils 42 exhibits a different response (e.g., a response varying from a normal no-objects-present baseline), control circuitry 16 can conclude that an external object (potentially a compatible wireless power receiving device) is present.

Control circuitry 30 has measurement circuitry 43. In an illustrative arrangement, measurement circuitry 43 of control circuitry 30 contains signal generator circuitry (e.g., oscillator circuitry for generating AC probe signals at one or more probe frequencies, a pulse generator, etc.) and signal detection circuitry (e.g., filters, analog-to-digital converters, impulse response measurement circuits, etc.). During measurement operations, device 24 may use measurement circuitry 43 to make measurements to characterize device 24 and the components of device 24. For example, device 24 may use measurement circuitry 43 to measure the inductance of coil 48 (e.g., signal measurement circuitry 43 may be configured to measure signals at coil 48 while supplying coil 48 with signals at one or more frequencies (to measure coil inductances), signal pulses (e.g., so that impulse response measurement circuitry in the measurement circuitry can be used to make inductance and Q factor measurements), etc. Measurement circuitry 43 may also make measurements of the output voltage of rectifier 50, the output current of rectifier 50, etc.

Figure 2:
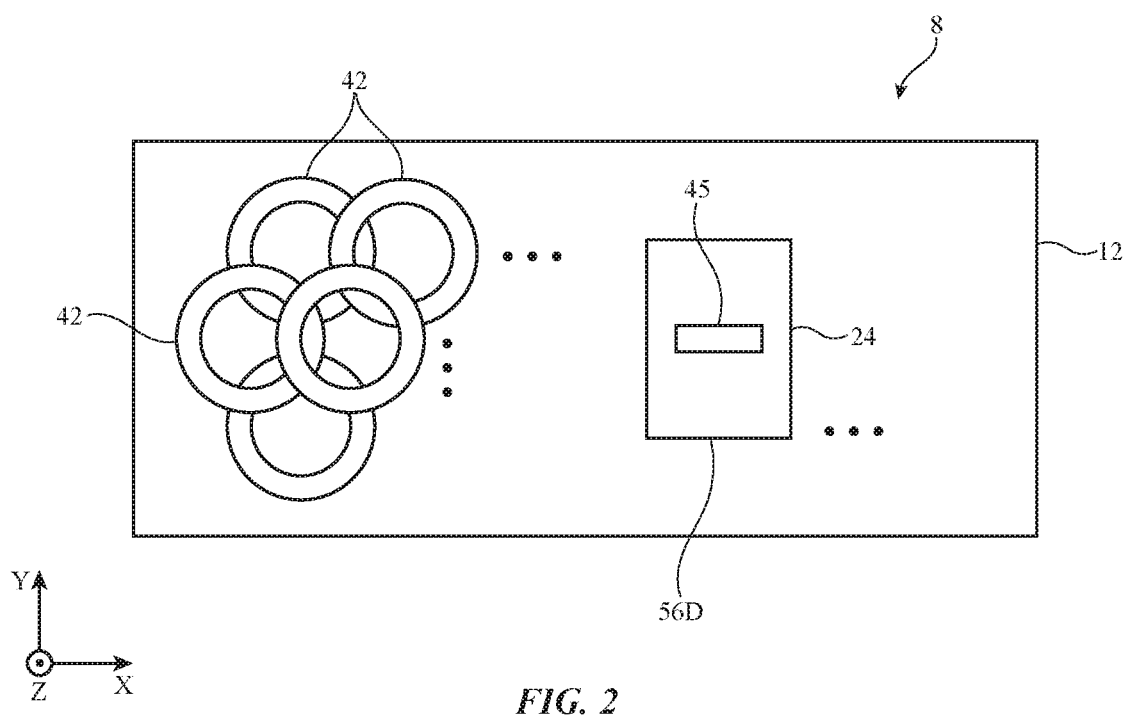
FIG. 2 is a top view of an illustrative wireless power transmitting device having a charging surface on which wireless power receiving devices are placed in accordance with an embodiment.

A top view of an illustrative configuration for device 12 in which device 12 has an array of coils 42 is shown in FIG. 2. Device 12 may, in general, have any suitable number of coils 42 (e.g., 22 coils, at least 5 coils, at least 10 coils, at least 15 coils, fewer than 30 coils, fewer than 50 coils, etc.). Coils 42 may be arranged in rows and columns and may or may not partially overlap each other. In the example of FIG. 2, there are three layers of coils 42 and the coils in each layer partially overlap coils in other layers. Other arrangements may be used, if desired.

As shown in FIG. 2, one or more devices 24 may be placed on device 12 (e.g., on coils 42). Device 24 may have a display such as display 56D or other visual output device in input-output devices 56. Display 56D may be used to display information such as information 45. Information 45 may include text, icons, and/or other content. In some embodiments, information 45 may include information on whether wireless power transmission operations are active in system 8 (e.g., charging status information such as a green battery icon or other information indicating that device 12 is transmitting wireless power that device 24 is receiving for charging battery 58, etc.).

System 8 may be configured to accommodate the simultaneous charging of multiple devices 24. During operation, a user may place a first device 24 followed by a second device and potentially additional devices in a particular order. In order to meet the user's expectations about charging behavior and enhance charging operations, information may be gathered such as information on the order in which devices 24 were placed on device 12 and other information on the various devices 24 that are available to be charged in system 8 and charging parameters associated with each device. With one illustrative arrangement, system 8 maintains information on the charging of devices 24 in a priority table (sometimes referred to as charging priority table, wireless power transfer priority table, wireless power transmission priority information, device charging priority information, etc.).

FIG. 3 is a diagram of an illustrative priority table. As shown in FIG. 3, the priority table may, as an example, include information such as an identifier (ID) that identifies each device 24. As an example, if two devices 24 are placed on device 12 for charging, the priority table will contain first and second rows with first and second entries corresponding respectively IDs for devices A and B. Additional information may be include in the entry for each device. For example, information may be included on whether each device 24 is to be charged by device 12 (indicated by a "Yes" entry in the row of the priority table corresponding to device A in the example of FIG. 3) or is to be denied wireless power (indicated by a "No" entry in the row of the priority table corresponding to device B in the example of FIG. 3). Information such as the order in which devices 24 were placed on device 12 can be included in the priority table, if desired (e.g., by adding each newly placed device 24 to a respective row at the bottom of the table in order). Additional information may be included if desired (e.g., information on the amount of power currently being drawn be each device 24 that is receiving power, etc.). Using the information of the priority table, system 8 performs operations such as deciding which devices 24 should be provided with wireless power, the priority to be given to each device 24 when providing wireless power, wireless power transmission levels, and other activities associated with transferring power between device 12 and one or more of devices 24.

Figure 4:
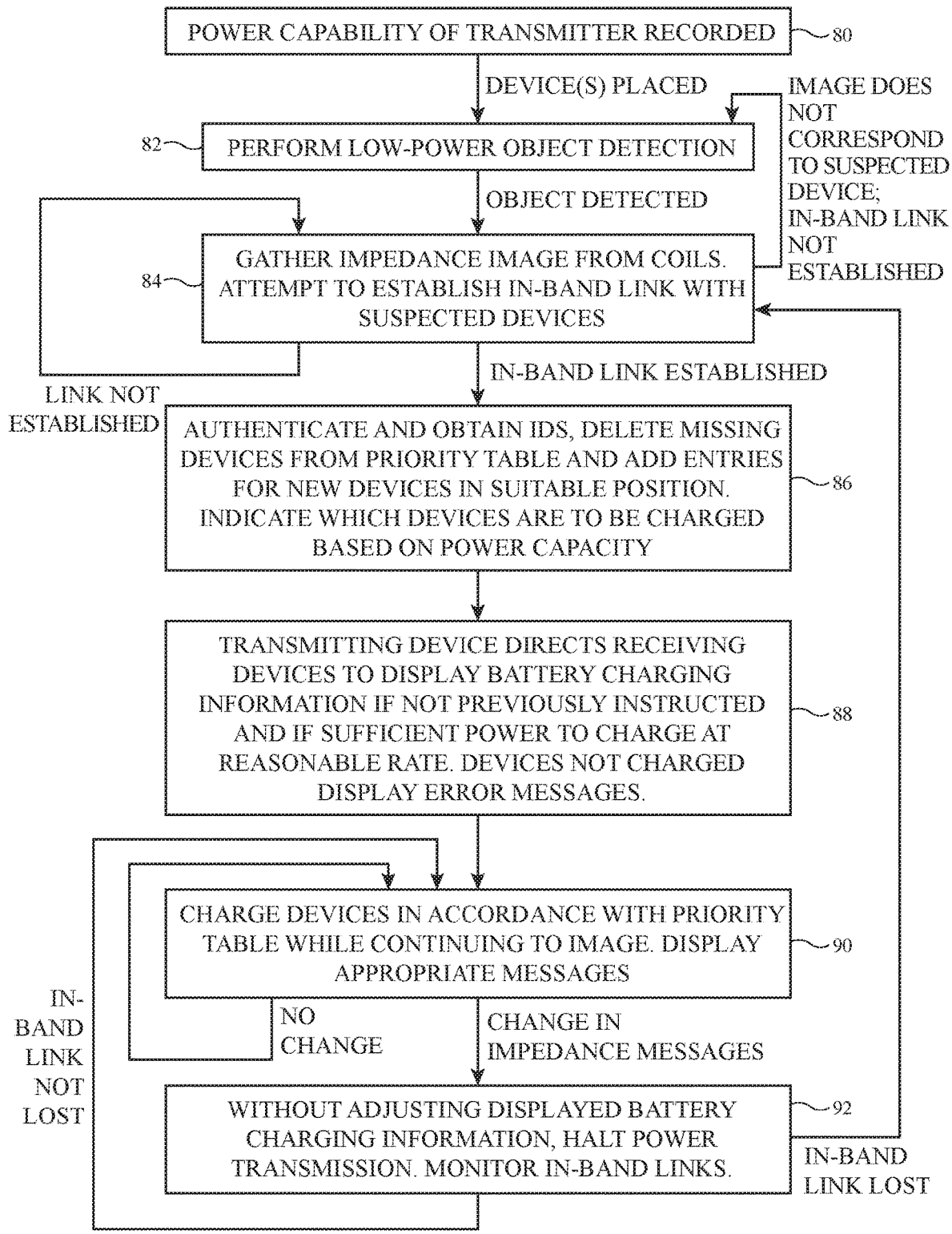
FIG. 4 is flow chart of illustrative operations involved in using the wireless charging system of FIG. 1 to charge wireless power receiving devices in accordance with an embodiment.

FIG. 4 is a flow chart of illustrative operations associated with managing the transfer of power with system 8.

During the operations of block 80, the power transmission capability of transmitting device 12 is determined and retained for later use. The power transmission capability of device 12 is determined at least partly by the power rating of AC-DC converter 14. The power transmission capability of device 12 may be 10 W, at least 5 W, 10-30 W, less than 40 W, less than 30 W, or other suitable power. Information such as the power transmission capacity of device 12, priority table information, and other information associated with the operation of system 8 may be stored on device 12, one or more of devices 24, and/or on remote storage (e.g., storage coupled to components in system 8 via the internet or other network(s)). Processing operations for system 8 may be performed using processing circuitry in system 8 such as control circuitry 16 and/or control circuitry 30 or other suitable processing circuitry.

A user may place one or more devices 24 on device 12, so that these devices may be charged by device 12. To determine when devices 24 are placed on device 12, device 12 may use measurement circuitry 41 to perform object detection operations during the operations of block 82. Measurement circuitry 41 may, for example, make low-power coil impedance measurements for coils 42 to determine when an external object has been placed on device 12. The low-power measurements may be made by applying a probe signal of a frequency of at least 500 kHz, less than 1.5 MHz, or other suitable frequency to each coil 42 while monitoring the resulting voltage on that coil.

In response to detection of placement of an object (e.g., a device 24) on device 12, additional impedance readings are gathered at block 84. The impedance readings of block 84 can include the results of impulse response measurements with circuitry 41 that determine the impedance (e.g., the inductance) of each coil 42. By gathering readings from each of coils 42, an inductance image is obtained. Image processing operations are then performed on the captured impedance image to determine whether the image contains an inductance pattern that is suspected to correspond to one of devices 24. If the pattern of inductance measurements in the image is not recognized as corresponding to any suspected devices 24 (e.g., of no objects are detected in the image or if an object is detected in the image that corresponds to a coin or other foreign object), system 8 can revert to lower power operations (e.g., monitoring the charging surface of device 12 using low-power measurements during the operations of block 82). If, however, the impedance image is recognized as containing a pattern that corresponds to a suspected device 24, device 12 attempts to establish a communications link with the device. For example, device 12 may attempt to establish an in-band communications link with the detected device 24 (e.g., using the coil(s) 42 overlapped by the detected device 24).

After establishing one or more in-band communications links with one or more devices 24, device 12 may, during the operations of block 86, authenticate one or more devices 24. An identifier (sometimes referred to as a receiving device identifier or receiver ID) is obtained for each wireless power receiving device 24 in communication with device 12. A priority table in device 12 is updated accordingly (e.g., missing devices 24 can be removed from the priority table). Entries for new devices 24 are added to the priority table in a suitable priority order. If, as an example, the priority table is organized so that the device in the first row of the table has a greater priority than the device in the second row of the table (and so on for addition rows), newly added devices 24 can be represented by adding entries to the bottom rows of the priority table in the order in which these devices are authenticated. In this way, charging priority can be given to the earliest device or devices placed on device 12. As an example, if a user places a phone, watch, and earbuds on device 12 (in that order), system 8 may give priority to the phone over the watch and may give priority to the watch over the earbuds.

There is a limited amount of power available for wireless charging in system 8, so the charging status of each of the devices 24 listed in the priority table is preferably determined based at least partly on the power capability of device 12 that was recorded during the operations of block 80. If, as an example, device 12 has a 10 W capacity and two cellular telephones are being charged by device 12, the placement of a third cellular telephone on the mat may create a situation in which there is insufficient capacity to charge the third cellular telephone at a reasonable rate without adversely affecting the charging of the first two cellular telephones. The determination of whether there is sufficient power available to charge a given device 24 can be made based on the known power capability of device 12 to the power needs of the various devices 24 that desire power from device 12 and the priority table entries indicating which devices have priority and are being charged. If the available power from device 12 does not exceed a predetermined threshold or if it is otherwise determined that there is insufficient power to charge a newly placed device with reasonable speed, charging for that device is denied and the priority table is updated accordingly. In particular, devices that are not to be charged are provided with "No" entries in the priority table. Devices with priority that are to be charged have "Yes" entries.

During the operations of block 88, device 12 directs the power receiving devices 24 that are to be charged (the "Yes" entries) to display battery charging information (e.g., a battery charge indicator) on their displays (e.g., displays in input-output devices 56 of FIG. 1), if these devices had not been previously instructed to display battery charging information. Devices that cannot be charged because of insufficient power available from device 12 can be instructed by device 12 to display error messages (e.g., an icon or other information that indicates that charging operations are not being performed due to insufficient power).

During the operations of block 90, devices 24 are charged in accordance with information in the priority table while device 12 uses measurement circuitry 41 to continue to capture impedance readings (e.g., impedance images) of the devices on coils 42. Each device 24 on device 12 continues to display charging information (e.g., "currently charging" or "currently not charging" icons or other charging messages). Missing devices (devices in the priority table for which no in-band link is present) are ignored. If a device loses its in-band link for more than a predetermined amount of time (e.g., 2 s or other suitable threshold amount), the device is deleted from the priority table (e.g., the table is updated to include only those devices that are present and have satisfactory in-band links). The impedance image information captured during the operations of block 90 is analyzed to determine whether there are any changes (e.g., by using image processing techniques to evaluate whether the current image differs by more than a threshold amount from the previous image). If no change to the impedance image is detected, power transmission can be resumed at block 90. If a change in the impedance image is detected, processing can proceed to the operations of block 92.

During block 92, in response to determining that the impedance image has changed, device 12 system 8 can temporarily halt power transmission to one or more of devices 24. For example, power transmission can be briefly interrupted for all devices 24. To prevent undue changes in the charging icons on devices 24, these icons (or other displayed messages containing charging status information and other information on the operation of system 8) may be maintained in their current state, pending analysis of the status of the in-band communications links between device 12 and devices 24.

If device 12 determines that the in-band links with devices 24 have been maintained (e.g., all links have been maintained) despite the detected change in the impedance image, devices 24 may continue to be charged and the priority table entries for devices 24 may each remain with a "Yes" entry. Charging (wireless power transfer operations) can then be resumed at block 90. In response to determining that one or more in-band links have been lost, however, device 12 can return to the operations of block 84 (and may, if desired, attempt to instruct the device that has been delinked and/or other devices 24 to remove any corresponding displayed battery charging icon). During block 84, device 12 can attempt to reestablish in-band links with suspected devices identified in the inductance image after which charging operations may be resumed as appropriate.

In accordance with the operations of FIG. 4, charging operations need not be disrupted when devices 24 are moved slightly during charging. For example, if a device 24 is inadvertently bumped and moves slightly (e.g., a small distance within the plane of the charging surface associated with device 12), the in-band link between that device 24 and device 12 will not be lost. As a result, power transfer will only momentarily be halted (e.g., during block 92 without changing the visual appearance of the charging icons or other charging information displayed on device 24 for the user) before being resumed normally (block 90). The visual appearance of the charging icons or other charging information displayed on device 24 may also remain unchanged in scenarios in which device 24 is bumped sufficiently to lose its in-band link but regains its in-band link at block 84 quickly (e.g., within 2 s or other suitable threshold time). If, on the other hand, a device 24 is lifted fully off of device 12 or otherwise loses its in-band link for more than the threshold amount of time (e.g., 2 seconds), power transfer will be halted at block 92 and device 12 may remove the display of the charging icon or other charging information from device 24. Movements in which in-band communications are not lost will not disrupt the ordering of entries in the priority table, so these movements will allow devices 24 to continue to be charged in accordance with the order in which they were placed on device 12. Movements that result in loss of in-band communications for more than a predetermined amount of time (e.g., 2 seconds) may cause devices 24 to be removed from the priority table, so that these devices will receive the lowest priority of the devices being charged when replaced on device 12.

In an illustrative embodiment, the charging icons or other charging information displayed on device 24 (sometimes referred to as charging status information) may be displayed for a debounce period following loss of wireless power transmission between device 12 and device 24. By imposing a debounce period before changing the visual appearance of the charging icons or other charging information displayed on device 24, undesirable flickering of the charging icon on device 24 can be avoided. If, as an example, a user slides device 24 across the surface of a mat or other device 12, in-band communications with the currently overlapped coil in device 12 may be interrupted and charging momentarily paused (e.g., device 12 may momentarily halt wireless power transmission). However, the in-band link may be reestablished with a new coil and charging resumed. If the in-band link is reestablished with the new coil and wireless power transmission is resumed within the debounce period, the visible appearance of the charging icons or other charging information displayed on device 24 need not change. In this way, a user who slides device 24 around on the surface of device 12 may not experience undesired flickering of the charging icon or other displayed charging information. As another example, device 12 may occasionally halt transmission of wireless power so that measurement circuitry 41 can perform coil measurements or other operations while power is not being transmitted to device 24. In this situation, the debounce period prevents the charging status indicator from being removed during a brief pause in power transmission.

Long debounce periods help provide sufficient time for control circuitry in device 12 to conduct coil measurements and other operations that are performed during periods of time in which transmission of wireless power is momentarily halted. Long debounce periods also help prevent charging status indicator flickering when a user is sliding device 24 around on the surface of device 12. Short debounce periods allow the charging status indicator to be removed from the display of device 24 rapidly following power loss, thereby providing a user with status information that is rapidly updated. System 8 may use a fixed debounce period or, to help accommodate both of these desires, a debounce period in system 8 may be adjusted based on whether a detected power loss in device 24 is due to user movement of device 24 relative to device 12 (e.g., movement of wireless power receiving circuitry 54 away from the charging surface associated with device 12 and away from power transmitting circuitry 52) or termination of power transmission by device 12.

In embodiments with an adjustable debounce period, input-output devices 56 include a motion sensor (e.g., an accelerometer, an inertial measurement unit that includes an accelerometer, gyroscope, and/or compass, and/or other sensors for detecting changes in orientation and/or position of device 12). Following a detected power loss, control circuitry 30 analyzes data from the motion sensor to determine whether device 12 has experienced motion of the type that is associated with user removal of device 24 from the charging surface of device 12 (e.g., vertical lifting motions in the Z dimension of FIG. 2) or has not experienced this type of motion (in which case device 12 can be assumed to have lost power due to a wireless power transmitting device depowering event not associated with user device removal such as depowering to perform coil measurements or depowering because the user is sliding device 24 on the surface of device 12 in the X-Y plane). Control circuitry 30 then adjusts the debounce period to a longer value (in response to detection of a loss of power not due to lifting during a user removal event) or a smaller value (in response to detection of a loss of power due to a user removal event).

Figure 5:
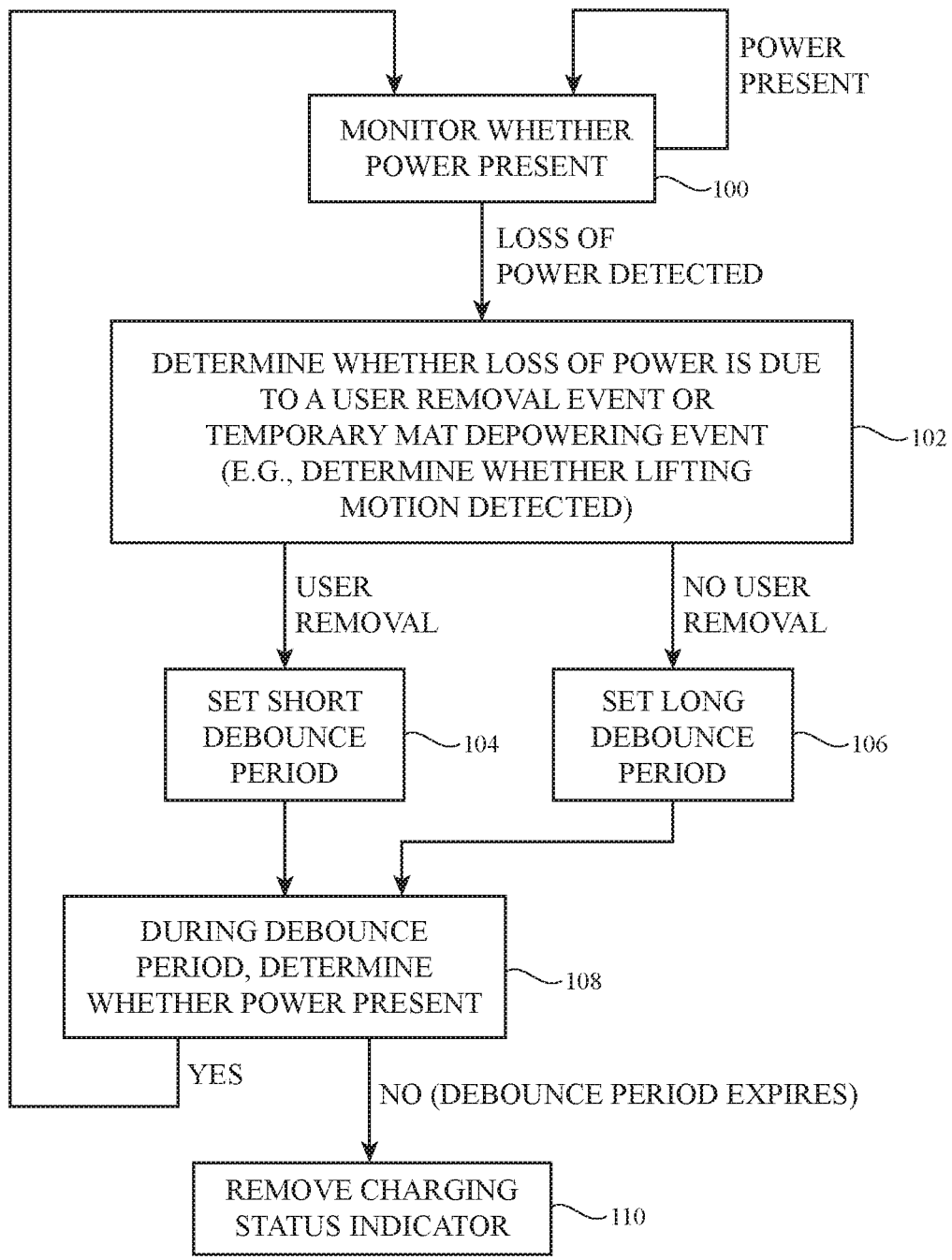
FIG. 5 is a flow chart of illustrative operations involved in using motion information in adjusting a charging status indicator debounce period for a wireless power receiving device in accordance with an embodiment.

A flow chart of illustrative operations associated with implementing an adjustable charging status indicator debounce period in system 8 are shown in FIG. 5. After a user places device 24 on the charging surface of device 12, control circuitry 16 of device 12 uses power transmitting circuitry 52 to transmit wireless power and power receiving device 24 receives the transmitted wireless power with power receiving circuitry 54. When control circuitry 30 senses receipt of wireless power, control circuitry 30 uses a display in input-output devices 56 (or other charge status output device in input-output devices 56) to display a charging indicator (e.g., a charging icon, informative text, etc.) for the user. This informs the user that the process of transferring wireless power from device 12 to device 24 (e.g., to charge battery 58) is active.

During the operations of block 100, while the charging status indicator is being displayed, device 24 uses control circuitry 30 to monitor power receiving circuitry 54 to determine whether power is being received. Control circuitry 30 may, for example, monitor the output voltage of rectifier 50. If the rectifier output stays at its normal operating level, monitoring operations may continue at block 100.

If, however, wireless power transmission is interrupted and the output voltage of rectifier 50 drops, control circuitry 30 may, during the operations of block 102, determine whether the loss of wireless power is due to a user lifting device 24 off of the charging surface of device 12. Control circuitry 30 may, for example, analyze the Z-axis (vertical) accelerometer data of a three-axis accelerometer in input-output devices 56 to determine whether device 24 has been moved vertically. If device 24 has not been moved or has only been moved laterally in the X-Y plane of FIG. 2 (e.g., parallel to the charging surface of device 12), recent Z-axis measurements will indicate little or no movement Z-axis movement. If, on the other hand, device 24 has been lifted by a user, the recent Z-axis measurements will contain data indicative of vertical motion of device 24 away from device 12.

In response to determining that the detected loss of power is due to user removal of device 24 (e.g., vertical movement of device 24 out of wireless power reception range by a user), device 24 can set the debounce period for the charging status indicator to a first debounce period value (e.g., 1.5 seconds or other suitable time period) during the operations of block 104. In some embodiments, device 24 may send periodic power adjustment commands to device 12 that direct device 12 to increase or decrease power transmission. In this type of arrangement, device 24 may, in response to determining that a detected reduction in power transmission is due to user removable of device 24, cease the transmission of such power adjustment commands to device 12 (e.g., device 24 can stop instructing device 12 to transmit desired amounts of power when device 24 is lifted from the charging surface and can no longer receive power). A charging status indicator that is being displayed on the display of device 24 can be removed in response to determining that the wireless power transmission has decreased while the motion sensor indicates that the wireless power receiving device has been lifted from the charging surface.

In response to determining that the detected loss of power is not due to user removal, device 24 can set the debounce period to a second debounce period value (e.g., 3 seconds or other suitable time period that is longer than the first debounce period) during the operations of block 106. In embodiments in which device 24 sends periodic power adjustment commands to device 12 to request an increase or decrease in power transmitted from device 12, device 24 may, in response to determining that a detected reduction in power transmission is not due to user removal, continue to communicate with device 12 regarding power transmission operations. For example, after confirming that a detected power drop is not due to user removal, device 24 may transmit a power increase request to device 12 that directs device 12 to increase the amount of power being wirelessly transmitted to device 24. A charging status indicator that is being displayed on the display of device 24 can be retained (for at least some period of time such as at least 0.5 seconds, at least 10 seconds, less than 2 minutes, less than 30 seconds, less than 3 seconds, etc.) in response to determining that the wireless power transmission has decreased while the motion sensor indicates that the wireless power receiving device has not been lifted from the charging surface.

During the debounce period (block 108), control circuitry 30 continues to display the charging status indicator on the display of device 24 (e.g., the charging status indicator is not removed from the display, even though a power loss was detected during the operations of block 100). This prevents undesired flickering in the charging status indicator in the event that power is received intermittently. Control circuitry 30 of power receiving device 24 monitors wireless power receiving circuitry 54 (e.g., control circuitry 30 monitors the output voltage of rectifier 50) during the operations of block 108 to determine whether power has been restored. If power transmission is resumed (continuously or even briefly in the event that power transmission device 12 issues a brief keep-alive pulse to ensure that the charging status indicator remains displayed), the charging status indicator continues to be displayed and further operations are performed at block 100. If power transmission is not resumed during block 108 and the debounce period expires, control circuitry 30 removes the charging status indicator from the display of device 24 during the operations of block 110.

If desired, system 8 may protect against coupling variations between power transmitting device 12 and receiving devices 24 by proportionally allocating transmitted power to devices 24. With one illustrative configuration, power is allocated in accordance with utilization factor information. For example, a utilization factor UF may be calculated by device 12 for each device 24 in accordance with the following equation:

$$UF = (\text{transmitted power drawn by receiving device}) / (\text{total power allocated to receiving device})$$

The amount of power that is drawn by each device 24 is influenced by factors such as the battery condition, device operating temperature (battery temperature), coupling variations, etc. By computing a utilization factor for each device and using this information in allocating transmitted power, power can be allocated effectively.

Consider, as an example, a scenario in which two cellular telephones (phone A and phone B) are placed on device 12. Device 12 may have a 10 W capacity. Initially, each device might be capable of drawing 7.5 W, but will only receive 5 W each due to the power delivery limitation of device 12. Phone B may have heat up more rapidly than phone A during charging. As a result, after a period of charging, phone A may demand (or draw) 5 W of power (using 100% of its allocated power), whereas phone B may demand (draw) only 3 W (due to its higher temperature and resulting lowered power draw). In this situation, the utilization factor UFA for phone A will be 5/10 and the utilization factor UFB for phone B will be 3/10. Power can then be allocated in accordance with the following equations:

$$\text{Power allocated to phone } A = 10 \text{ W} * UF1/(UF1+UF2)$$

$$\text{Power allocated to phone } B = 10 \text{ W} * UF2/(UF1+UF2)$$

By allocating power in this way, devices 24 that are drawing less power (e.g., due to coupling variations, thermal considerations, battery parameters, etc.) will receive less allocated power than devices that are drawing more power. This utilization-factor-based allocation arrangement or other suitable power transmission allocation technique may be applied to each of the devices 24 that are listed in the priority table as being charged ("Yes" entries) during the operations of blocks 88 and 90 (e.g., when determining whether sufficient power is available to charge devices at a reasonable rate and when charging devices in accordance with the priority table).

The foregoing describes a technology in which data, such as information about whether a wireless power receiving device is moved, is transmitted during wireless power transmission to facilitate battery charging operations. On the topic of data transfer, it is noted (out of an abundance of caution) that entities responsible for the collection, analysis, disclosure, transfer, storage, or other use of personal information data should comply with well-established privacy policies and/or privacy practices, if the present technology is utilized to transfer such data. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

To the extent that the present technology is leveraged to transmit personal information data, hardware and/or software elements can be provided for users to selectively block the use of, or access to, personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app. It is also possible for a user to be prompted on whether or not to begin wireless charging operations should a wireless power provider request such personal information.

It is the intent of the present disclosure to describe a robust wireless power system involving data transmission. In implementations of this technology where personal information data is transmitted, that personal information data should be managed and handled in a way to minimize risks of unintentional or unauthorized access or use. Risk can be minimized by limiting the collection of data and deleting data once it is no longer needed. In addition, and when applicable, data de-identification can be used to protect a user's privacy. De-identification may be facilitated, when appropriate, by removing specific identifiers (e.g., unique device identifiers, usernames, etc.), controlling the amount or specificity of data stored (e.g., collecting location data at a city level rather than at an address level), controlling how data is stored (e.g., aggregating data across users), and/or other methods.

The foregoing is merely illustrative and various modifications can be made to the described embodiments. The foregoing embodiments may be implemented individually or in any combination.

What is claimed is:

1. A wireless power receiving device configured to wirelessly receive power during wireless power transmission from a wireless power transmitting device having a charging surface, comprising:
   wireless power receiving circuitry including a coil and a rectifier, wherein the rectifier is configured to receive wireless power signals with the coil and is configured to supply a corresponding output voltage;
   a motion sensor;
   a display; and
   control circuitry configured to:

monitor the output voltage to determine whether the wireless power transmission is present;
display a charging status indicator on the display when the wireless power transmission is determined to be present; and
in response to determining that the wireless power transmission has been lost, using the loss of wireless power transmission to trigger evaluation of data from the motion sensor to determine whether the wireless power receiving circuitry has been lifted away from the charging surface.

2. The wireless power receiving device of claim 1 wherein the control circuitry is configured to continue to display the charging status indicator on the display for a debounce period that starts when the wireless power transmission is lost.

3. The wireless power receiving device of claim 2 wherein the control circuitry is configured to monitor for resumption of the wireless power transmission during the debounce period.

4. The wireless power receiving device of claim 3 wherein the control circuitry is configured to remove the charging status indicator from the display upon expiration of the debounce period without detection of resumption of the wireless power transmission during the debounce period.

5. A wireless power receiving device configured to wirelessly receive power during wireless power transmission from a wireless power transmitting device having a charging surface, comprising:
wireless power receiving circuitry;
a motion sensor configured to produce motion sensor data;
a display; and
control circuitry configured to:
display a charging status indicator on the display; and
monitor the wireless power receiving circuitry to determine whether the wireless power is being received;
in response to determining that the wireless power is not being received and that the motion sensor does not indicate that the wireless power receiving circuitry has been lifted from the charging surface, initiate a charging status indicator debounce period having a first value; and
in response to determining that the wireless power is not being received and that the motion sensor indicates that the wireless power receiving circuitry has been lifted from the charging surface, initiate a charging status indicator debounce period having a second value that is less than the first value.

6. The wireless power receiving device of claim 5 wherein the control circuitry is configured to:
display the charging status indicator for the entire charging status indicator debounce period; and
remove the charging status indicator at expiration of the charging status indicator debounce period when the wireless power is not received for the entire debounce period.

7. A wireless power receiving device configured to wirelessly receive power during wireless power transmission from a wireless power transmitting device having a charging surface, comprising:
wireless power receiving circuitry including a coil and a rectifier, wherein the rectifier is configured to receive wireless power signals with the coil and is configured to supply a corresponding output voltage;
a three-axis accelerometer;
control circuitry configured to:
monitor the output voltage;
transmit power adjustment commands to the wireless power transmitter based at least partly on the monitored output voltage;
monitor the three-axis accelerometer; and
in response to determining that the wireless power transmission has decreased while the three-axis accelerometer indicates that the wireless power receiving device has not been moved vertically from the charging surface, transmit a power adjustment command to the wireless power transmitting device requesting an increased in transmitted power; and
in response to determining that the wireless power transmission has decreased while the three-axis accelerometer indicates that the wireless power receiving device has been moved vertically from, but not laterally on, the charging surface, cease transmitting the power adjustment commands.

8. The wireless power receiving device of claim 7 further comprising a display that is configured to display a charging status indicator, wherein the control circuitry is configured to:
remove the charging status indicator in response to determining that the wireless power transmission has decreased while the three-axis accelerometer indicates that the wireless power receiving device has been moved vertically from, but not laterally on, the charging surface; and
retain the charging status indicator in response to determining that the wireless power transmission has decreased while the three-axis accelerometer indicates that the wireless power receiving device has not been moved vertically from the charging surface.

9. One or more non-transitory, computer-readable media having instructions that, when executed by one or more processors, cause a device to:
monitor a rectified output voltage to determine whether wireless power transmission is present;
display a charging status indicator when the wireless power transmission is present;
in response to determining that the wireless power transmission has been lost, using the loss of wireless power transmission to trigger evaluation of motion sensor data to determine whether the device has been lifted away from a charging surface of a wireless power transmitting device.

10. The one or more non-transitory, computer-readable media of claim 9, wherein the instructions, when executed, further cause the device to:
continue to display the charging status indicator for a debounce period that starts when the wireless power transmission is lost.

11. The one or more non-transitory, computer-readable media of claim 10, wherein the instructions, when executed, further cause the device to:
monitor for resumption of the wireless power transmission during the debounce period.

12. The one or more non-transitory, computer-readable media of claim 11, wherein the instructions, when executed, further cause the device to:
stop displaying the charging status indicator upon expiration of the debounce period without detection of resumption of the wireless power transmission during the debounce period.

13. One or more non-transitory, computer-readable media having instructions that, when executed by one or more processors, cause a device to:
- display a charging status indicator;
- produce motion sensor data;
- monitor wireless power receiving circuitry in the device to determine whether wireless power is being received;
- in response to determining that the wireless power is not being received and that the motion sensor data does not indicate that the wireless power receiving circuitry has been lifted from a charging surface of a wireless power transmitting device, initiate a charging status indicator debounce period having a first value; and
- in response to determining that the wireless power is not being received and that the motion sensor data indicates that the wireless power receiving circuitry has been lifted from the charging surface, initiate a charging status indicator debounce period having a second value less than the first value.

14. The one or more non-transitory, computer-readable media of claim 13, wherein the instructions, when executed, further cause the device to:
- display the charging status indicator for the entire charging status indicator debounce period.

15. The one or more non-transitory, computer-readable media of claim 14, wherein the instructions, when executed, further cause the device to:
- stop displaying the charging status indicator at expiration of the charging status indicator debounce period when the wireless power is not received for the entire debounce period.

16. One or more non-transitory, computer-readable media having instructions that, when executed by one or more processors, cause a device to:
- monitor a rectified output voltage and accelerometer data;
- transmit power adjustment commands to a wireless power transmitter based at least partly on the rectified output voltage;
- in response to determining that wireless power transmission has decreased while the accelerometer data indicates that the device has not been moved vertically from a charging surface of the wireless power transmitter, transmit a power adjustment command to the wireless power transmitter requesting an increased in transmitted power; and
- in response to determining that the wireless power transmission has decreased while the accelerometer data indicates that the device has been moved vertically from, but not laterally on, the charging surface, cease transmitting the power adjustment commands.

17. The one or more non-transitory, computer-readable media of claim 16, wherein the instructions, when executed, further cause the device to:
- display a charging status inductor.

18. The one or more non-transitory, computer-readable media of claim 17, wherein the instructions, when executed, further cause the device to:
- stop displaying the charging status indicator in response to determining that the wireless power transmission has decreased while the accelerometer data indicates that the device has been moved vertically from, but not laterally on, the charging surface.

19. The one or more non-transitory, computer-readable media of claim 17, wherein the instructions, when executed, further cause the device to:
- keep displaying the charging status indicator in response to determining that the wireless power transmission has decreased while the accelerometer data indicates that the device has not been moved vertically from the charging surface.

* * * * *